No. 12,551. REISSUED NOV. 6, 1906.

H. F. MARANVILLE.

CAN CLOSURE.

APPLICATION FILED OCT. 28, 1905.

2 SHEETS—SHEET 1.

WITNESSES:

Brennan B. West.

A. L. Lord.

INVENTOR,

Harvey F. Maranville.

BY

Fouts & Hull.

ATTORNEYS.

No. 12,551. REISSUED NOV. 6, 1906.

H. F. MARANVILLE.

CAN CLOSURE.

APPLICATION FILED OCT. 28, 1905.

2 SHEETS—SHEET 2.

WITNESSES.

Brennan B. West.

A. L. Lord.

INVENTOR,

Harvey F. Maranville

BY

Fouts & Hull,

ATTORNEYS.

UNITED STATES PATENT OFFICE.

HARVEY F. MARANVILLE, OF AKRON, OHIO.

CAN-CLOSURE.

No. 12,551. Specification of Reissued Letters Patent. Reissued Nov. 6, 1906.

Original No. 751,318, dated February 2, 1904. Application for reissue filed October 28, 1905. Serial No. 284,917.

*To all whom it may concern:*

Be it known that I, HARVEY F. MARANVILLE, residing at Akron, in the county of Summit and State of Ohio, have invented a certain new and useful Improvement in Can-Closures, of which the following is a full, clear, and exact description, reference being made to the accompanying drawings.

My invention relates to improvements in the class of cans which are commonly formed of sheet metal and are adapted to hold liquids by rendering liquid-tight their closure through the medium of their cover.

My invention relates particularly to the construction of that portion of the can having the opening therein through which access is obtained to the interior thereof and to the covering for such opening; and the object of my invention is to provide a simple but novel construction which shall render the can-closure liquid-tight even though the can be subjected to rough handling and the cover be subjected to considerable pressure from within the can, as by the liberation of vapors or gases or the generation thereof by the heating or decomposition of the contents. This tightness of closure is effected by so constructing the closure and the coöperating portions of the top of the can as to cause simultaneous contact between various portions of the cover and can, so that if for any reason one closure proves ineffective one or the balance thereof will serve to prevent the escape of the contents of the can, this result being facilitated by forming the engaging portions with such evenness as to prevent the formation of air-spaces by insuring perfect contact and yet permit the ready removal of the cover of the can when desired. While this tightness of closure is secured by the coöperation of the various points of contact between the cover and the can, the ability to preserve a liquid-tight joint or closure under rough handling and considerable pressure from within is more especially due to the peculiar construction of the outer portion of the cover and the coöperating outer portion of the top or neck of the can.

To the accomplishment of the aforesaid objects my invention consists in the peculiar and novel construction, arrangement, and combination of parts hereinafter described, reference being had to the accompanying drawings, forming a part hereof.

Figure 1:
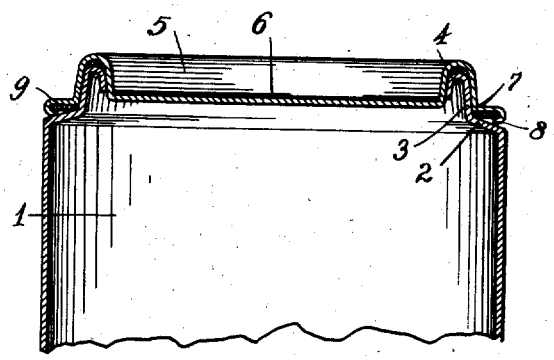
Figure 2:
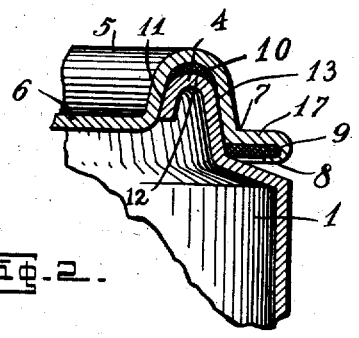
Figure 3:
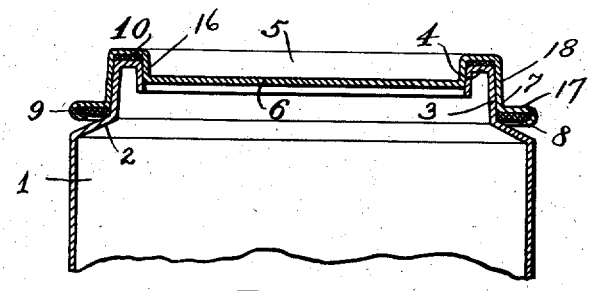
Figure 4:
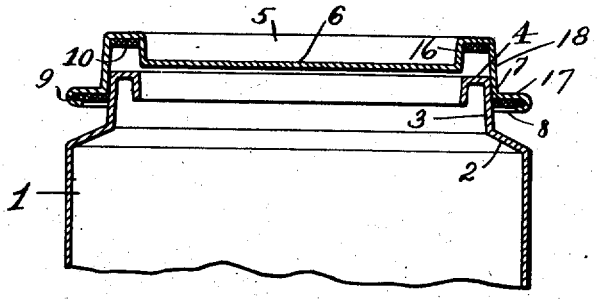

In the accompanying drawings, in which similar reference-numerals indicate like parts in the different figures, Figure 1 is a section through the center of a can, showing the means by which the cover is retained thereon; Fig. 2, an enlarged view of the joint between the cover and the can. Fig. 3 is a view similar to Fig. 1 of a can-cover having flattened upper portions. Fig. 4 is a similar view with the cover partially removed.

In the drawings, 1 represents a can, which is preferably made of sheet metal, near the upper end of which is an internal shoulder 2, from which rises a portion 3, which is of slightly-conical contour, the upper end of said portion being inwardly turned and curved or flattened at a point 4 and thence projecting downwardly at a slight outward inclination, the inclination being toward the vertical center of the can. Adapted to fit over this portion of the can and complete a closure thereof is a cap 5, having a centrally-depressed center 6, the sides or walls of which rise with an inclination directed toward the vertical center of the can and are then rounded or flattened a little larger than the top of the curved portion 4 of the can.

In manufacturing the turn 4 in the top of the can it may be made with a perfectly-circular form, as shown in Figs. 1 and 2, or with a flattened top and with its edges slightly rounded to meet the depending sides, as shown in Figs. 3 and 4. From thence the outside or outer wall of the cover is bent abruptly downwardly, with a conical inclination parallel to that of the exterior 3 of the can 1. Thus it will be seen that these inner and outer walls form around the centrally-depressed portion 6 an upturned annular groove. The lower end of the outer wall of the cover is continued to the point 7, when it is abruptly turned outward and then rounded, with its under or outer edge directed inward at the point 8. Within this inturned portion 8 of the cover is embraced a washer 9, of suitable material.

In order to effect a complete and absolutely certain joint between the cover and the can, I customarily place a washer or thin layer of cement 10 in the hollow portion of the cover, into which the curved or flattened end 4 of the can projects.

It will be seen that when the can is properly filled ready for closing and the cover 5 is placed thereon there will be five points of contact between the cover and can proper.

These five points of contact are, first, the joint between the inner wall of the depressed portion 6 of the cover against the downwardly-inturned edge of the can. This point in Fig. 2 is marked 11. A second joint is between the upper curved ends of the cover and can, the space between which is filled by cement or a washer 10. This joint is numbered 12. A third joint is between the outer wall of the cover and the outside of the upright inclined portion 3 of the can, which point is numbered 13. In placing this cover 5 on top of the can-top the washer 9 is slightly smaller in internal diameter than the greatest diameter of the upright portion 3 of the can, so that as the lid is forced downward contact is obtained between the washer 9 and the outside upwardly-turned portion 3, which constitutes the fourth point of contact or closure between the cap and the jar. When this cap 5 has been pushed down snugly upon the jar-top, the under face of the washer 9 presses upon the shoulder 2 of the jar, forming the fifth point of contact between the cover and the jar. It is intended that all these points of contact shall subserve the common purpose of forming a tight contact between the cover and the can.

It is obvious that in the drawings the upright portions of both the cap 5 and can 1 are inclined at an angle considerably in excess of what they will be in actual practice with a view to more fully illustrate the frictional engagement between the cover and the can. This amount of inclination in actual practice may be comparatively slight in order to effect an absolutely tight joint between the two; but in order to more readily illustrate the application of these inclined faces they are to a certain extent exaggerated in the drawings with this object in view. This slight inclination faciltates the application of the cover to the top of the can, as owing to the presence of the flange 17 the lower portion of the cover cannot yield or spring outwardly at such times.

Both of the washers 9 and 10 may be of any material suitable for this purpose and are preferably made of material not affected by the contents of the can.

In order to remove the cover from the can, a knife-blade or its equivalent is inserted between the shoulder 2 and the inturned part 8 of the cover and the cover is readily pried from its seat, permitting access to the contents of the can.

In the use of this can-closure by manufacturers desiring to ship or place on the market a liquid preparation the cover 5 is forced down, as shown in Figs. 1, 2, and 3, which causes the five points of contact to coact, the result of which will be that the outside of the inner wall of the depressed portion of the cover will force outwardly the top 4 of the can-top against the outer wall of the cover, making a tight joint with the upright portion 3 of the can. This in itself will make a substantially air and liquid tight joint and serve to keep atmospheric air from coming in contact with the washer or coating of cement 10, thereby preserving its quality as an excluder of air and a preventive against the escape of the contents of the can and serving to preserve the lasting qualities of this washer indefinitely. When the can reaches the consumer, the lid or cover 5 is raised, allowing free access to the contents of the can, and as it frequently happens in the use of certain kinds of liquids, particularly where a brush is used, the interior of the downward-turned portion of the can-top becomes to a certain extent coated with the contents of the can, thereby preventing the return of the cover to its former position by reason of the fact that the inner wall of the centrally-depressed portion 6 of the lid cannot enter the downwardly-inclined portion of the can. This objection is frequently met with in a large number of the cans now in use, and to overcome this objection my cover is made both an outside-sealing and an inside-sealing one. Hence when the consumer has used a portion of the contents of the can and desires to exclude the air therefrom all that is necessary to do is to press the cover down upon the can-top to about the extent shown in Fig. 4 and the can will be sealed.

It rarely happens that in removing liquids from a can the outside of the portion 3 of the can becomes coated by the contents of the can, and hence this joint is substantially at all times capable of use and insures a perfect seal for the can. This is aided by the fact that the washer 9 will likewise press against the outside of the upright portion 3 of the can and afford an additional safeguard against the admission of air or the escape of the contents of the can. From this it will be seen that after the can has been opened the first time it may still be used at intervals, as required, notwithstanding the fact that the interior of the downwardly-turned portion of the can-top becomes coated with the liquid of the can, as it will be seen by reference to Fig. 4 that the depressed portion 6 of the cover does not reach far enough down to have its inner wall come in contact with the can itself.

It frequently happens that the volatile constituents of the contents of the cans are liberated, as by partial decomposition of such contents or by subjecting the same to heat. This causes the depressed portion of the cover to be bowed upwardly, drawing the lower portion of the wall 16 inwardly, with corresponding distortion of the outer wall 18. The flange 17 prevents the outer wall from springing outwardly in the plane thereof and for a considerable distance above such flange, the action being apparently such as would occur were the cover pivoted in substantially the plane of the junction of the depressed portion 6 with the wall 16. The function of the flange 17 in preventing leakage is increased by the presence of the washer 9; but such washer may be entirely omitted and the closure be liquid-tight under the conditions above set forth. The effect of this flange in so preventing leakage is enhanced by the fact that the walls 3 and 18 are substantially vertical, the inclination being only sufficient to permit of the easy application of the cover to the can-top.

Having thus described my invention, what I claim as new, and desire to secure by Letters Patent of the United States, is—

1. The combination, with a can having its upper portion substantially vertical and provided with a downturned inner edge, of a cover therefor having a depressed central portion surrounded by an upturned groove having inner and outer walls, the inner wall adapted to engage the downturned edge of said can and the outer wall being substantially vertical to conform to and engage the upper portion of the outer wall of said can, said outer wall of the cover being provided with a reinforcing-flange projecting laterally therefrom to prevent distortion or expansion of said wall in the plane of said flange, substantially as specified.

2. The combination, with a can having its upper portion substantially vertical and provided with a downturned inner edge, of a cover therefor having a depressed central portion surrounded by an upturned groove having inner and outer walls, the inner wall adapted to engage the downturned edge of said can and the outer wall shaped to conform to and engage the upper portion of said can, said outer wall of the cover projecting below the plane of the depressed portion of the cover and being provided therebelow with a reinforcing-flange projecting laterally therefrom, substantially as specified.

3. The combination, with a can having its upper portion provided with a downturned inner wall, of a cover therefor having a depressed central portion surrounded by an upturned groove having inner and outer walls, said walls being shaped to conform to and engage the corresponding walls of the can-top, the outer wall of said cover projecting below the plane of such central portion and having its bottom edge provided with a reinforcing-flange projecting laterally therefrom to prevent distortion or expansion of such edge, substantially as specified.

4. The combination, with a can having its upper portion substantially vertical and provided with a downturned inner wall, of a cover therefor having an upwardly-projecting annular groove and a central flexible portion within said groove, the outer wall of said groove projecting downwardly, conforming to and adapted to fit the outer wall of said can and provided with a laterally-projecting reinforcing-flange, substantially as specified.

5. The combination, with a can having its upper portion substantially vertical and provided with a downturned inner wall, of a cover therefor having an upwardly-projecting annular groove and a central flexible portion within said groove, the outer wall of said groove projecting downwardly, conforming to and adapted to fit the outer wall of said can and provided at its lower extremity with a laterally-projecting reinforcing-flange, substantially as specified.

6. The combination with a can provided at its upper portion with a slightly inwardly inclined top having a reflected downwardly-turned inner edge, a cover for said can having a depressed central portion surrounded by an upturned groove composed of inner and outer walls, the inner wall to engage said downwardly-reflected edge of said can, said outer wall to bear against the outer face of said inwardly-inclined portion of the can, said outer wall being relatively wider than the inner wall of said cover to engage the inwardly-inclined portion of said can previous to the engagement of the inner wall of said cover and the reflected downwardly-turned inner edge of the can, a washer or its equivalent placed in the concave portion of the groove in said cover to engage the upper annular edge of said can and a washer held in position at the base of the outer wall of said cover to engage the outer portion of the inwardly-inclined top of said can.

7. The combination with a can provided with an inturned shoulder slightly inclined from which projects an inwardly-inclined portion having a reflected downwardly-turned inner edge, a cover for said can having a depressed central portion surrounded by an upturned groove composed of an inner and outer wall, the inner wall to engage said downwardly-reflected edge of said can, said outer wall of said cover of approximately greater width than the inner wall and having its lower portion abruptly turned outward in substantially a horizontal plane and then reflected inwardly toward the can, a washer held within this reflected portion of said outer wall to engage and form an approximately air-tight joint both with the outer side of the inwardly-inclined portion of the can and the inclined shoulder thereof.

8. The combination with a can provided with an inturned shoulder slightly inclined from which projects an upwardly-inclined portion having a reflected downwardly-turned inner edge, a cover for said can having a depressed central portion to engage said downwardly-reflected end of said can, an outer rim to bear against the outer face of said upwardly-inclined portion and means at the bottom of said cover to retain a washer, and a washer so retained capable of frictional engagement with the outside of said upwardly-inclined portion and said inclined shoulder.

9. The combination with a can provided at its upper portion with a slightly inwardly inclined top having a reflected downwardly-turned inner edge, a cover for said can having a depressed central portion to engage said downwardly-reflected edge of said can, the greatest diameter of said depressed portion of said cover which is arranged to enter the upper end of said can being equal to or slightly exceeding the opening bounded by the downwardly-reflected inner edge of said can, an outer rim or wall on said cover to bear against the outer face of said inwardly-inclined portion of said can and means at the bottom of said outer wall of said cover to retain a washer and a washer so retained capable of frictional engagement with the outside of said inwardly-inclined portion and said inclined shoulder.

In testimony whereof I affix my signature in the presence of two witnesses.

HARVEY F. MARANVILLE.

Witnesses:
J. B. HULL,
CASSIE MCELROY.